Jan. 27, 1970 J. D. CALLAN 3,492,496
TRISTABLE MULTIVIBRATOR
Filed Dec. 12, 1966
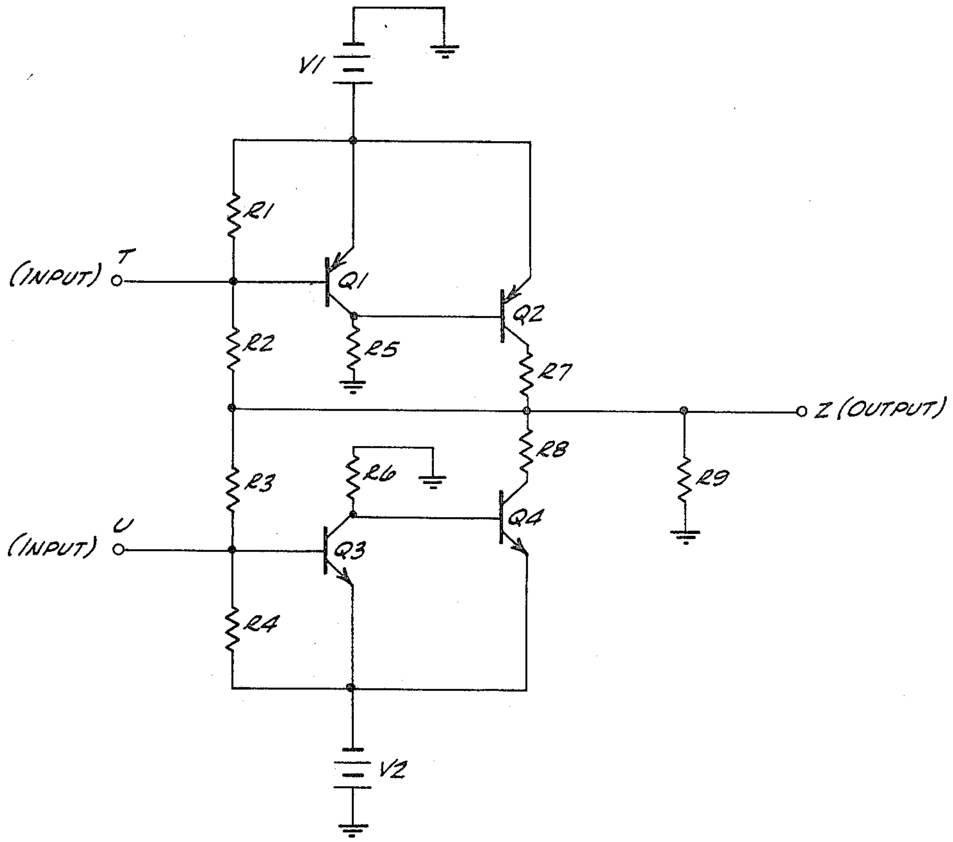
INVENTOR.
JOHN DAVID CALLAN,
BY
Thomas R. Bolton
ATTORNEY.

United States Patent Office 3,492,496
Patented Jan. 27, 1970

3,492,496

TRISTABLE MULTIVIBRATOR

John David Callan, Newbury Park, Calif., assignor to Hughes Aircraft Company, Culver City, Calif., a corporation of Delaware Filed Dec. 12, 1966, Ser. No. 601,231
Int. Cl. H03k *19/08*
U.S. Cl. 307—209 1 Claim

ABSTRACT OF THE DISCLOSURE

A tristable multivibrator for selectively producing one of three output voltage levels at an output circuit in response to selective application of any of three input voltage levels to first and second switching circuits which are coupled to the output circuit. Each switching circuit includes first and second switching means. Each of the first switching means is responsive to the particular input voltage level applied thereto for controlling the operational states of the corresponding second switching means. The output voltage level is a function of the operational states of the second switching means of both switching circuits.

This invention relates generally to logic circuits and more particularly to a tristable multivibrator logic circuit having three stable states: logical zero, logical one, and logical two.

The tristable multivibrator of the present invention belongs to the general class of multivibrators which includes the monostable (one shot), the bistable (flipflop), and the astable (free running). The tristable multivibrator is similar to the bistable multivibrator which is a logic circuit which stores information by assuming either of two stable states: logical zero and logical one. However, the number of components in a logic circuit can be reduced by using ternary elements rather than binary elements. Some of the advantages, for example, of a ternary digital computer over a binary digital computer are that fewer memory elements are required (e.g. the number "eight" can be stored with two ternary flip-flop as against three binary flip-flops); faster serial operation for a given number as a result of fewer parts; more efficient usage of memory when the function to be stored is three valued (which often occurs in digital controllers and digital differential analyzers). Various electrical circuits having ternary inputs and outputs and useful in ternary logic systems are known, however, each of these circuits is subject to various disadvantages. Some of these disadvantages are: high input current required, high output impedance, requires adjustments to set the output levels, use of resistor dividers which can drift and cause instability, require up to three voltage supplies, and the circuits require a large number of components.

It is a primary object of this invention to provide a tristable multivibrator.

It is another object of this invention to provide a tristable memory unit which works with ternary (three valued) inputs, which provides ternary outputs, and which is useful in ternary logic systems.

It is a further object of this invention to provide a tristable multivibrator which: has high input impedance and low output impedance; requires only two voltage supplies; employs fewer parts than previous tristable circuits; is insensitive to parameter variations: requires no resistor dividers (which could cause drift and instability); and which requires no adjustments to set the output levels.

These objects are accomplished according to the present invention by providing a tristable electrical circuit including a pair of interconnected PNP transistors and a pair of interconnected NPN transistors. The circuit includes a first voltage source of positive polarity connected to the emitters of the pair of PNP transistors and a second voltage source of negative polarity connected to the emitter of the pair of NPN transistors. A first input terminal is connected to the base of one transistor of the pair of PNP transistors and a second input terminal is connected to the base of one transistor of the pair of NPN transistors. An output terminal is resistively coupled to the collectors of each of the other transistors of each pair. The circuit has three levels for the output and employs three-level feedback in a single circuit to obtain three stable states.

These and other objects and advantages of the present invention will be more fully understood by reference to the following detailed description when read in conjunction with the attached drawing, in which:

The figure is a schematic circuit diagram of the tristable multivibrator of the present invention.

The figure shows a pair of PNP transistors Q1 and Q2 coupled together with the base of the transistor Q2 connected to the collector of the transistor Q1. The emitters of both of the transistors Q1 and Q2 are connected directly to the positive terminal of a voltage source V1. A pair of NPN transistors Q3 and Q4 are similarly coupled together with the collector of the transistor Q3 connected to the base of the transistor Q4. The emitters of both transitors Q3 and Q4 are connected directly to the negative terminal of a voltage source V2.

A resistor R1 is connected from the voltage source V1 to the common leads of the T input, the base of the transistor Q1 and one lead of a resistor R2. The other lead of the resistor R2 is connected to the output terminal Z. A resistor R3 is connected from the output terminal Z, to the common leads of the input terminal U, the base of the transistor Q3 and one lead of a resistor R4. The other lead of the resistor R4 is connected to the negative supply voltage V2. A resistor R5 is connected from the common leads of the collector of the transistor Q1 and the base of the transistor Q2 to ground. A resistor R6 is connected from ground to the common leads of the collector of the transistor Q3 and the base of the transistor Q4. A resistor R7 is connected from the collector of the transistor Q2 to the output terminal Z. A resistor R8 is connected from the collector of the transistor Q4 to the output terminal Z. A resistor R9 is connected from the output terminal Z to ground.

The base of the transistor Q3 is connected to the common leads of the input terminal U, the resistor R3 and a resistor R4. The emitter of transistor Q3 is connected to the negative supply voltage. The collector of transistor Q3 is connected to the common leads of a resistor R6 and the base of the transistor Q4. The base of the transistor Q4 is connected to the common leads of the collector of the transistor Q3 and one lead of the resistor R6. The emitter of the transistor Q4 is connected to the negative supply voltage. The collector of the transistor Q4 is connected to one lead of a resistor R8, the other lead of the resistor R8 being connected to the output terminal Z1. The input T is connected to the common leads of the resistors R1, R2 and the base of the terminal transistor Q1. The input terminal U is connected to the common leads of the resistors R3, R4 and the base of the transistor Q3. The output terminal Z is connected to the common leads of the resistors R2, R3, R7, R8, and R9. The positive supply voltage V1 is connected to the common leads of the resistor R1 and the emitters of transistors Q1 and Q2. The negative supply voltage V2 is connected to the common leads of the resistor R4 and the emitters of the transistors Q3 and Q4.

Having described the circuit itself in some detail, a brief description of its operation, including a truth table, will now be set forth.

The circuit has three stable output states: logical 0=−10 v., logical 1=0 v., and logical 2=+10 v. When the circuit is in the logical 0 (=−10 v.) state Q1 and Q4 are ON (saturated), and Q2 and Q3 are OFF (cut-off). Q3 is OFF because its base to emitter voltage is equal to $$\frac{100\text{K ohms}}{510\text{K ohms}+100\text{K ohms}}\times V_{CE_{SAT}}(Q4)$$

Q2 is OFF because its base to emitter voltage is equal to $$V_{BE}(Q2)=V_{CE_{SAT}}(Q1)$$

Q1 and Q4 are held ON by R2 and R6 respectively.

When the circuit is in the logical 1 (=0 v.) state Q1 and Q3 are ON and Q2 and Q4 are OFF. The output Z which is at 0 volts feeds back and keeps Q1 and Q3 ON through R2 and R3.

When the circuit is in the logical 2 (=+10 v.) state Q2 and Q3 are ON and Q1 and Q4 are OFF. The output Z feeds back to keep Q3 ON and Q1 OFF.

The inputs T and U can cause the circuit to change states according to the truth table shown below.

| T | U | $Z_{n+1}$ |
|---|---|---|
| 0 | 0 | 0 |
| 0 | 1 | 1 |
| 0 | 2 | 1 |
| 1 | 0 | 0 |
| 1 | 1 | 1 |
| 1 | 2 | 1 |
| 2 | 0 | (1) |
| 2 | 1 | 2 |
| 2 | 2 | 2 |

(1) Not allowed.

The synthesis of this circuit was based on the observations that the control for Q1 should be negative with respect to the emitter when $Z=\overline{2}$ if $Z\epsilon\{0, 1, 2\}$, that is $Z=\{0, 1\}$. Similarly the control for Q3 should be positive with respect to the emitter when $Z=\overline{0}=\{2, 1\}$.

A more detailed description of the operation of the tristable multivibrator with respect to each of the possible input combinations follows.

With the inputs T and U at a logical zero ($Z=-10$ volts), the next state of the tristable multivibrator will be state zero. With the inputs T and U at −10 volts, the transistor Q1 will be ON, which in turn turns the transistor Q2 OFF. The transistor Q3 will be turned OFF, and the resistor R6 will then turn transistor Q4 ON. With the transistor Q4 ON, and the transistor Q2 OFF, the output Z will be held at −10 volts through the resistor R8. Upon removing the inputs, the resistors R3 and R4 will continue to hold the transistor Q3 OFF, and the resistor R2 will continue to hold the transistor Q1 ON.

With the inputs T and U at zero volt (logical 1), the next state of the tristable multivibrator will be logical 1. With T and U at zero volts, the transistors Q1 and Q3 will be turned ON, which will turn the transistors Q2 and Q4 OFF. The resistor R9 will hold the output at ground. Upon removing the inputs, the resistors R2 and R3 will continue to hold the transistors Q1 and Q3 ON.

With the inputs T and U at logical 2, the next state of the tristable multivibrator will be logical 2. With the inputs T and U at +10 volts, the transistor Q1 is held OFF, and the resistor R5 then turns the transistor Q2 ON. The transistor Q3 is turned ON which is turn holds the transistor Q4 OFF. With the transistor Q2 ON, and the transistor Q4 OFF, the output Z is held at +10 volts through the resistor R7. Upon removing the inputs T and U, the resistors R1 and R2 hold the transistor Q1 OFF. The resistor R3 holds the transistor Q3 ON, and the tristable multivibrator remains in the logical 2 state.

With the input T at logical zero and the input U at logical 1, the next state of the tristable multivibrator will be logical 1. With the input T at logical zero, the transistor Q1 will be held ON, which in turn will turn the transistor Q2 OFF. With the input U at logical 1, the transistor Q3 will be ON, which in turn will turn the transistor Q4 OFF. With the transistors Q2 and Q4 OFF, the resistor R9 will hold the output Z at ground.

With the input T at logical zero and the input U at logical 2, the output 2 will similarly remain at ground. With the input T at logical 1 and the input U at logical zero, the next state of tristable multivibrator will be at logical zero. With the input T at zero volts the transistor Q1 will be held ON, which in turn will hold the transistor Q2 OFF. With the input U at −10 volts the transistor Q3 will be held OFF, and the resistor R6 will turn the transistor Q4 ON. The output Z will be held at −10 volts through the transistor Q4 and resistor R8.

With the input T at logical 1 and the input U at logical 2, the next state of the tristable multivibrator will be logical 1. With the input T at zero volts, the transistor Q1 will be held ON, which in turn will hold the transistor Q2 OFF. With the input U at +10 volts, the transistor Q3 will be held ON, which in turn will hold the transistor Q4 OFF. Since both the transistor Q2 and the transistor Q4 are OFF, the output will be held at ground through the resistor R9. With the input T at logical 2 and the input U at logical zero, the output of the tristable multivibrator is indeterminate because both of the transistors Q2 and Q4 would be turned ON. With the input T at logical 2 and the input U at logical 1, the next state of the tristable multivibrator will be logical 2. With the input T at +10 volts, the transistor Q1 will be held OFF, the resistor R5 will then turn the transistor Q2 ON. With the input U at zero volts the transistor Q3 will be held ON, which will hold the transistor Q4 OFF. With the transistor Q2 ON and the transistor Q4 OFF, the output Z will be held at +10 volts through the resistor R7.

The each of the above cases, the resistors R2 and R3 provide the feedback necessary to hold the tristable multivibrator in its stable state after the inputs T and U are removed. The inputs may be coupled into the tristable multivibrator in several ways: through resistors, diodes or capacitors.

When the output is at +10 volts and the input T is not present, the transistor Q1 will be held OFF because the saturation voltage of the transistor Q2, when divided by the resistor divider composed of the resistors R1 and R2, is not sufficient to turn the transistor Q1 ON. Similarly, when the output Z is at −10 volts and the input U is not present the transistor Q3 is held OFF because the saturation voltage of the transistor Q4 is sufficiently divided down by the resistor divider composed of the resistors R3 and R4.

The recent development of an inexpensive three level memory has significantly improved the usefulness of ternary logic devices. No major ternary equipment has been built to date primarily because most memory devices are binary. The three level magnetic tape promises to change this.

This particular circuit can be the basic building block in a ternary digital computer. It would be particularly advantageous in a digital plant controller because of its close correspondence to the typical desired outputs: positive error, no error, negative error. In digital differential analyzers it is useful because the typical output is three valued: overflow, no overflow, underflow.

What is claimed is:

1. A tristable electrical circuit comprising:

an output circuit;

a first switching circuit including first means for receiving a first voltage, first and second switching means connected in series, a first input circuit for receiving one of the first, second, and third input signals being connected to said first switching means, and the second switching means being connected in series between said first means and said output circuit, said first switching means being responsive to one of the first and second input signals for switching said first switching circuit to a first stable state by closing said second switching means to prevent the first voltage from being applied to said output circuit and being further responsive to the third input signal for switching said first switching circuit to a second stable state by opening said second switching means to allow the first voltage from said first means to be applied to said output circuit; and a second switching circuit including second means for receiving a second voltage, third and fourth switching means connected in series, a second input circuit for receiving one of fourth, fifth, and sixth input signals being connected to said third switching means, and said fourth switching means being connected in series between said second means and said output circuit, said third switching means being responsive to the fourth input signal for switching said second switching circuit to a third stable state by closing said fourth switching means to prevent the second voltage from being applied to said output circuit and being further responsive to one of the fifth and sixth input signals for switching said second switching circuit to a fourth stable state by opening said fourth switching means to allow the second voltage from said second means to be applied to said output circuit.

References Cited

UNITED STATES PATENTS

| | | | |
|---|---|---|---|
| 3,042,810 | 7/1962 | Rochelle | 307—288 |
| 3,207,922 | 9/1965 | Gruodis et al. | 328—206 |
| 3,227,965 | 1/1966 | Madsen et al. | 307—288 |
| 3,359,433 | 9/1967 | Thauland | 307—243 |
| 3,379,900 | 4/1968 | Lang | 307—288 |
| 3,404,294 | 10/1968 | Metcalf | 307—288 |

DONALD D. FORRER, Primary Examiner

HAROLD A. DIXON, Assistant Examiner

U.S. Cl. X.R.

307—288